United States Patent
Paulraj et al.

(10) Patent No.: US 11,811,589 B1
(45) Date of Patent: Nov. 7, 2023

(54) SOFTWARE DEFINED STORAGE AWARE HARDWARE ACCELERATED NVME INITIATOR SERVICE

(71) Applicant: DELL PRODUCTS L.P., Round Rock, TX (US)

(72) Inventors: Deepaganesh Paulraj, Bangalore (IN); Ankit Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/157,313

(22) Filed: Jan. 20, 2023

(51) Int. Cl.
 *H04L 41/0654* (2022.01)
 *H04L 41/40* (2022.01)
 *H04L 67/141* (2022.01)
 *H04L 67/1097* (2022.01)

(52) U.S. Cl.
 CPC .......... *H04L 41/0654* (2013.01); *H04L 41/40* (2022.05); *H04L 67/1097* (2013.01); *H04L 67/141* (2013.01)

(58) Field of Classification Search
 CPC . H04L 41/0654; H04L 67/1097; H04L 67/01; H04L 67/14; H04L 67/141; H04L 41/0659; H04L 41/0661; H04L 41/0663; H04L 67/1095
 See application file for complete search history.

(56) References Cited

U.S. PATENT DOCUMENTS

| | | | |
|---|---|---|---|
| 10,564,857 B2 | 2/2020 | Benisty et al. | |
| 11,435,955 B1* | 9/2022 | Venkatanarayanan | G06F 3/061 |
| 2015/0006663 A1* | 1/2015 | Huang | G06F 13/42 709/213 |
| 2018/0024778 A1 | 1/2018 | Singh et al. | |
| 2018/0109446 A1* | 4/2018 | Srinivasan | H04L 45/302 |
| 2019/0361605 A1* | 11/2019 | Kanno | G06F 3/0679 |
| 2020/0403916 A1* | 12/2020 | Klein | H04L 49/25 |
| 2022/0027051 A1* | 1/2022 | Kant | G06F 3/0605 |
| 2022/0231905 A1* | 7/2022 | Dhatchinamoorthy | H04L 67/1048 |
| 2022/0318106 A1* | 10/2022 | Cosby | G06F 3/0644 |
| 2022/0334725 A1* | 10/2022 | Mertes | G06F 16/275 |
| 2022/0377027 A1* | 11/2022 | Gai | H04L 45/74 |

* cited by examiner

*Primary Examiner* — Jonathan A Bui
(74) *Attorney, Agent, or Firm* — Larson Newman, LLP

(57) ABSTRACT

An information handling system in an infrastructure-as-a-service (IaaS) system includes a memory for storing code and a processor to execute code to instantiate an IaaS NVMe orchestrator. The IaaS NVMe orchestrator establishes a first fabric link with a first target NVMe array of storage resources of the IaaS, establishes a second fabric link with a second target NVMe array of the storage resources, and establishes a first session on the storage resources. The first session includes a first namespace on the first target NVMe array and a second namespace on the second target NVMe array. The first and second namespaces are mirrored namespaces. The IaaS NVMe orchestrator further determines that the first fabric link has failed, and establishes a third fabric link with the first target NVMe array in response to determining that the first fabric link has failed.

20 Claims, 3 Drawing Sheets

SOFTWARE DEFINED STORAGE AWARE HARDWARE ACCELERATED NVME INITIATOR SERVICE

FIELD OF THE DISCLOSURE

This disclosure generally relates to information handling systems, and more particularly relates to providing a software defined storage (SDS) aware hardware accelerated NVMe initiator service.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system in an infrastructure-as-a-service (IaaS) system may include a memory for storing code and a processor to execute code to instantiate an IaaS non-volatile memory-express (NVMe) orchestrator. The IaaS NVMe orchestrator may establish a first fabric link with a first target NVMe array of storage resources of the IaaS, establish a second fabric link with a second target NVMe array of the storage resources, and establish a first session on the storage resources. The first session may include a first namespace on the first target NVMe array and a second namespace on the second target NVMe array. The first and second namespaces may be mirrored namespaces. The IaaS NVMe orchestrator may further determine that the first fabric link has failed, and establish a third fabric link with the first target NVMe array in response to determining that the first fabric link has failed.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures as needed or desired.

Figure 1:
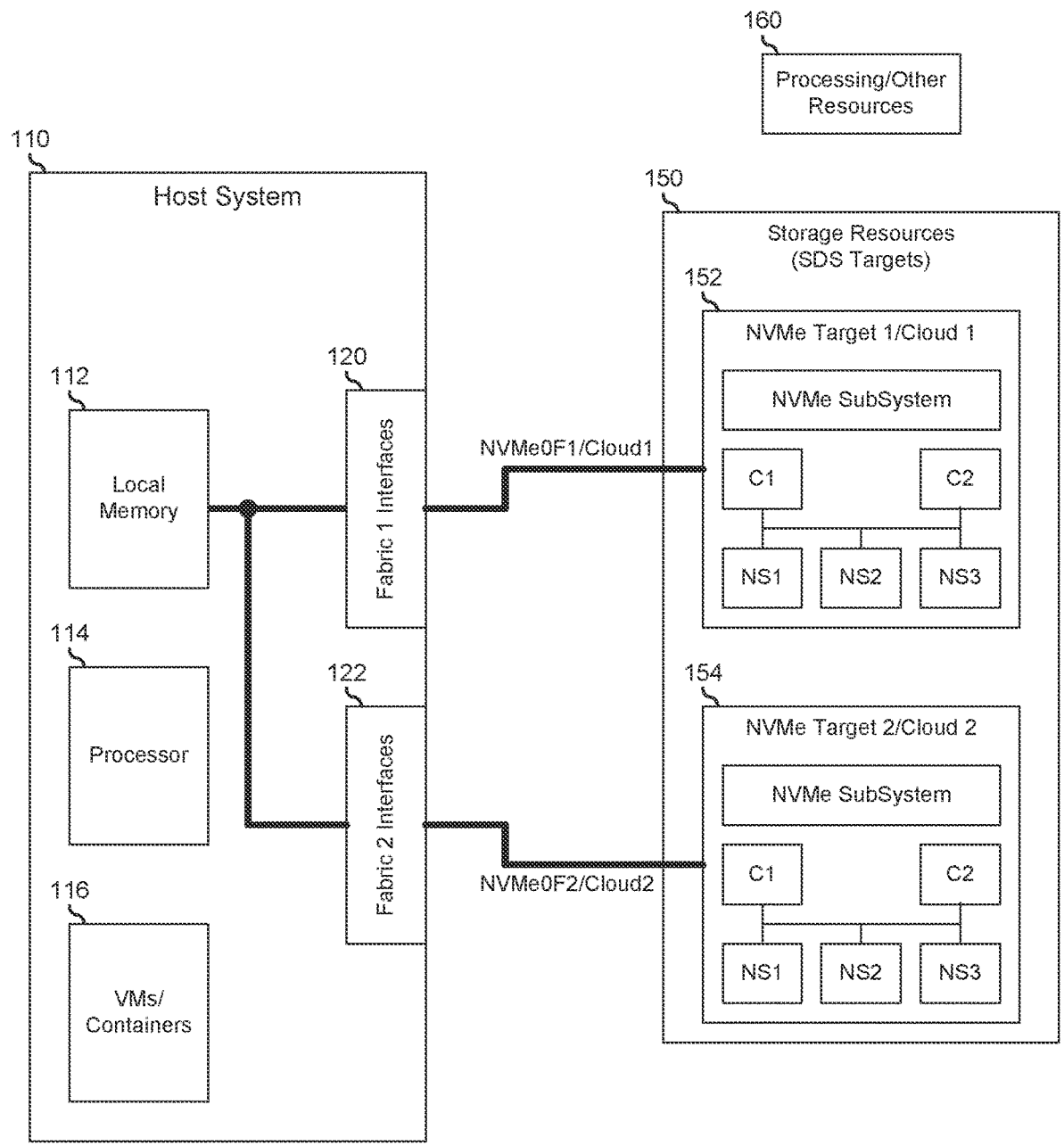
FIG. 1 is a block diagram of an Infrastructure-as-a-service (IaaS) system according to an embodiment of the current disclosure.

FIG. 1 illustrates an infrastructure-as-a-service (IaaS) system 100. IaaS system 100 represents a service-oriented processing architecture that provides processing resources, network resources, and storage resources as a virtualized computing resource to subscribers who can select the resources needed for their particular computing needs, without having to monitor, manage, or maintain the actual resources in a subscriber-controlled environment. As such, IaaS system 100 may be understood to present subscribers with specific hardware or virtualized hardware which the subscribers can configure to their specific computing desires. IaaS system 100 may be distinguished from similar platform-as-a-service (PaaS) systems that provide subscribers with a configurable operating environment (a platform), such as a hosted operating system (OS) on a selected platform architecture, and from similar software-as-a-service (SaaS) systems that provide subscribers with a hosted application service without regard to the underlying hardware upon which the hosted applications are run. Thus, in IaaS system 100, the subscriber does not monitor, manage, or maintain the underlying infrastructure, but does have control over the configuration and operation of the architecture employed on the selected hardware, the operating system instantiated on the selected hardware, the storage utilization, and the applications deployed on the selected hardware.

IaaS system 100 includes a host system 110, a set of storage resources 150, and a set of processing and other resources 160. Host system 100 represents a system utilized by a subscriber of IaaS system 100 and includes a local memory 112, a processor 114, a set of virtual machines (VMs) and containers 116 instantiated on the host system, and fabric interfaces 122 and 124. Broadly, host system 110 represents an information handling system such as the information handling system 300 illustrated in FIG. 3, where local memory 112, processor 114, and fabric interfaces 120 and 122 represent the hardware components of the information handling system, and where VMs/containers 116 represent elements of the information handling system that are instantiated by a virtual machine manager (VMM) or hypervisor. Fabric interfaces 120 and 122 represent communication interfaces that are in accordance with a particular interface standard. An example of an interface standard may include an Ethernet interface, a Fibre Channel interface, a Remote Direct Memory Access (RDMA) interface, a proprietary interface, or the like.

Processing and other resources 160 represent hardware resources or virtualized resources of IaaS system 100 that are available to subscribers to the IaaS system, such as general processing resources (CPUs), graphics processing resources (GPUs), field programmable gate array (FPGAs) resources, network resources and the like. The details of utilizing processing resources and other resources of a IaaS system are known in the art and will not be further described herein, except as may be needed to illustrate the current embodiments.

Storage resources 150 represent various data storage devices operated on IaaS system 100 that are available to the subscribers of the IaaS system, and typically include Non-Volatile Memory Express (NVMe) devices, or other types of data storage devices, as needed or desired. As illustrated, storage resources 150 include NVMe targets 152 and 154. Storage resources 150 are operated as a Software Defined Storage (SDS) array, where one or more bulk storage devices or storage arrays are configured in a storage architecture as desired by a subscriber of IaaS system 100. As such, NVMe target 152 is illustrated as instantiating a first cloud-based storage and NVMe target 154 is illustrated as instantiating a second cloud-based storage. Here, the definition and access of NVME targets 152 and 154 are accessed by respective fabric interfaces 120 and 122. Thus it will be understood that storage resources 150 may provide various fabric interfaces to each of NVMe targets 152 and 154, based upon an available fabric interface for the NVMe targets. For example, fabric interface 122 may represent a Fibre Channel interface and NVMe target 152 may represent a Fibre Channel-based NVMe target, while fabric interface 124 may represent an Ethernet interface and NVMe target 154 may represent an Ethernet-based NVMe target.

IaaS system 100 may be configured to implement an NVMe-over-fabric conversion to permit communications over the various fabrics between host system 110 and storage resources 150, but permit the actual data storage operations to be provided in a native NVMe protocol with NVMe targets 152 and 154. Host system 110 is provided with information related to NVMe targets 152 and 154 that provide the host system with access to the NVMe targets. The information may include a NVMe qualified name (NQN) for each of NVMe targets 152 and 154, various controller identifiers (CIDs) for the NVMe controllers implemented on the NVMe targets, and the namespace identifiers (NIDs) implemented on each controller. In this way, each remote namespace is exposed as a unique logical unit number (LUN) to host system 110, and transactions with the various LUNs are provided over fabric interfaces 120 and 122 as needed or desired.

Host system 110, and particularly the processing resources of local memory 112 and processor 114, are utilized to monitor, manage, and maintain the data storage transfers between VMs/containers 116 and storage resources 150. Where such data storage transfers are directed to only one of NVMe targets 152 or 154, the utilization of local memory 112 and processor resources 114 may provide an acceptable overhead for host system 110. Moreover, host system 110 may include a Remote Direct Memory Access (RDMA) device or smart network interface card (Smart NIC) that is configurable to determine a memory block within local memory 112 and perform the data storage transfers to and from the memory block without invoking processor resources. However, RDMA devices and Smart NICs are typically provided based upon a particular fabric, and thus may only be usable with a particular one of NVMe targets 152 or 154.

Moreover, the data storage transfers between VMs/containers 116 and storage resources 150 may be directed to more than one of NVMe targets 152 and 154. For example, it may be desirable to target a particular data transaction to redundant LUNs in order to provide resilience in case one of the NVMe targets fails. In another example, it may be desirable to target spread the data associated with another data transaction across multiple LUNs in order to provide faster read/write access to the data. In such cases, directing data storage transactions to more than one of NVMe targets 152 and 154 represents an increased utilization of local memory 112 and processor 114 to monitor the schedule the multiple data storage transactions to the multiple fabric interfaces 120 and 122 for redundancy, or to divide the data to the different fabric interfaces for improved data access.

It has been understood that the typical use of storage resources 150 as provided by IaaS system 100 represents a large processing overhead for the processing resources of host system 110. Moreover, the architecture of IaaS 100, with the use of separate fabric interfaces 120 and 122 to access NVMe targets 152 and 154, represents a potential for single point failures in the fabric interfaces.

Figure 2:
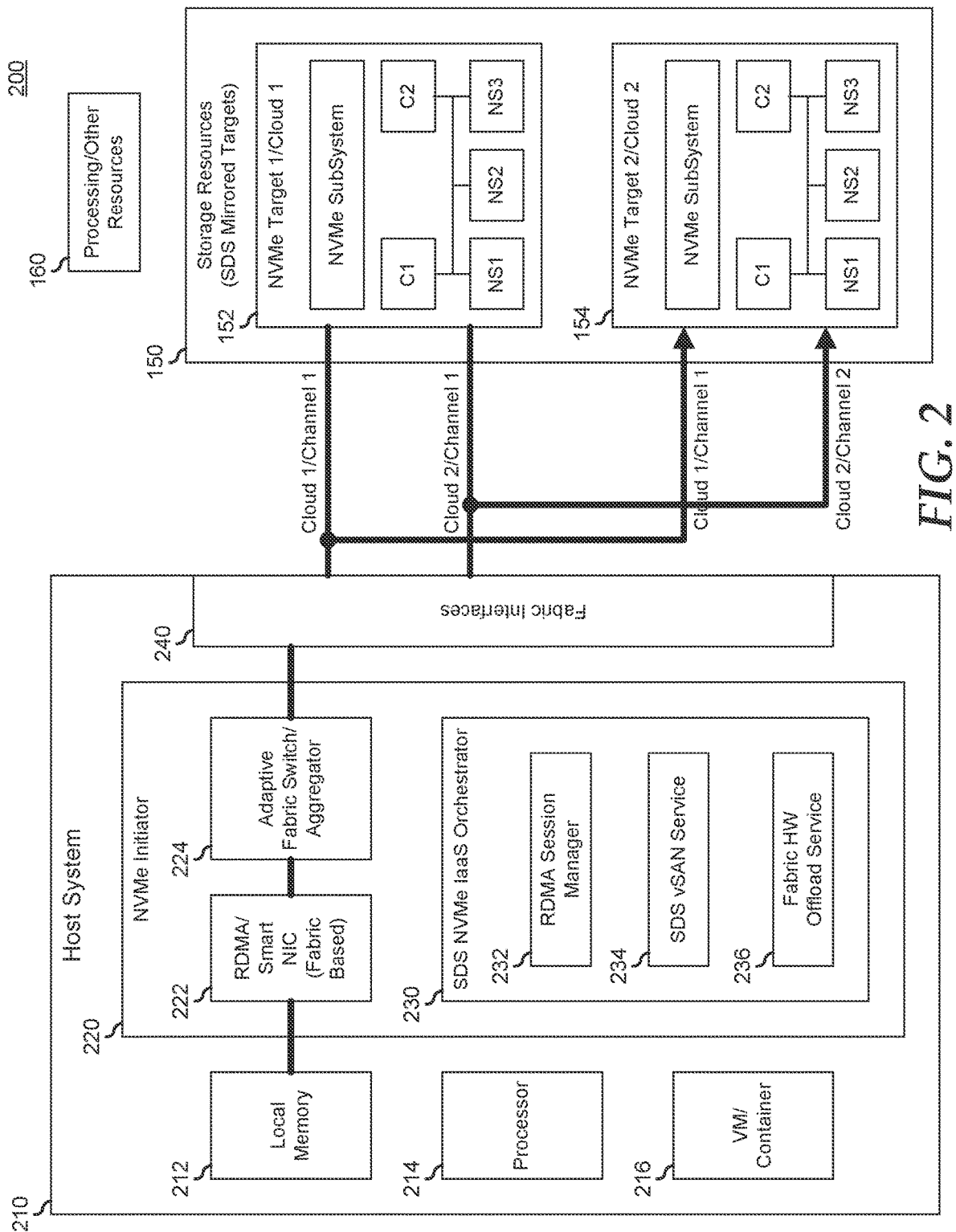
FIG. 2 is a block diagram of an IaaS system according to another embodiment of the current disclosure.

FIG. 2 illustrates an IaaS system 200 similar to IaaS system 100, including a host system 210 similar to host system 110, storage resources 150, and processing and other resources 160. Host system 210 includes a local memory 212 similar to local memory 112, a processor 214 similar to processor 114, various VMs/containers 216 similar to VMs/containers 116, a NVMe initiator module 220, and various fabric interfaces 240. IaaS system 200 utilizes various protocol-over-fabric communication mechanisms whereby a data communication targeted to a device that operates with a particular protocol is encapsulated in a data transaction on a fabric that operates with a different protocol from the target device. Thus fabric interfaces 240 represent one or more fabric interface with potentially multiple interface protocols, similar to fabric interfaces 120 and 122, where NVMe initiator 220 operates to encapsulate NVMe transactions to NVMe targets 152 and 154 for transmission over the fabric interfaces. In this regard, fabric interfaces 240 may be understood to aggregate, under the control of NVMe initiator module 220, all of the interface functions to storage resources 150.

NVMe initiator module 220 includes a RDMA/Smart NIC 222, an adaptive fabric switch and aggregator (switch/aggregator) 224, and an SDS NVMe IaaS orchestrator (SNI orchestrator) 230. SNI orchestrator 220 includes a RDMA session manager 232, a SDS vSAN (virtual SAN) service 234, and a fabric hardware offload service 236. SNI orchestrator 230 represents a portion of the virtualized environment of host system 210 that operates to monitor, manage, and maintain the operations of the data storage transactions between VMs/containers 216 and storage resources 150.

In monitoring the data storage transactions, SNI orchestrator 230 operates to determine the types of transactions being initiated by VMs/containers 216, to determine a storage configuration for the various data storage transactions, and to provide management transactions to NVMe targets 152 and 154 to set up the determined configuration. For example, a particular VM or container may be determined by SNI orchestrator 230 to provide data storage transactions that are critical to the application instantiated by the VM or container. SNI orchestrator 230 may determine that the data storage transactions from the particular VM or container should be transacted redundantly to ensure that a failure of one of NVMe targets 152 or 154 does not adversely impact the performance of the VM or container, and may set up redundant namespaces on the NVMe targets to establish the redundancy across the NVMe targets. FIG. 2 illustrates where fabric interfaces 240 are configured to provide a redundant storage cloud (Cloud 1) that routes data storage transactions on redundant channels (Channel 1) to NVME targets 152 and 154.

In another example, another VM or container may be determined by SNI orchestrator 230 to provide data storage transactions that are latency sensitive. SNI orchestrator 230 may determine that the data storage transactions from the other VM or container should be transacted across NVMe targets 152 and 154, and may set up interleaved namespaces on the NVMe targets so that data reads and writes are conducted more quickly. Any particular VM or container may provide data transactions that require different storage configurations, based upon the applications instantiated thereon, and so SNI orchestrator 230 may operate to establish multiple storage configurations for any particular VM or container, as needed or desired. SNI orchestrator 230 is not limited to operating with regard to only VMs/containers 216, but may monitor data storage transactions associated with a hosted environment, such as an operating system, a VMM, a hypervisor, or the like, instantiated on host system 210, as needed or desired, and can set up storage configurations on NVMe targets 152 and 154 for such a hosted environment, as needed or desired. FIG. 2 further illustrates where fabric interfaces 240 are configured to provide a distributed storage cloud (Cloud 2) that routes data storage transactions across separate channels: Channel 1 to NVMe target 152, and Channel 2 to NVMe target 154. Other data storage configurations may be provided as needed or desired.

In managing the operations of the data storage transactions between VMs/containers 216 and storage resources 150, SNI orchestrator 230 operates to schedule and direct the data storage transactions, and establish data storage transaction flows, for example over RDMA/Smart NIC 222. RDMA/Smart NIC 222 may be understood to represent a particular fabric interface of fabric interfaces 224. However with regard to FIG. 1, an RDMA/Smart NIC like RDMA/Smart NIC 222 would be relegated to only providing the RDMA or Smart NIC functions for the associated fabric, but would not otherwise be available for transactions on fabric interfaces associated with a different fabric. Because NVMe initiator 220 implements NVMe-over-fabric conversion, RDMA or Smart NIC transactions can be encapsulated for transmission over fabric interfaces associated with a different fabric from RDMA/Smart NIC 222. In this way, the RDMA and Smart NIC functions may be extended to other transactions with NVMe targets 152 and 154, as needed or desired. In a particular example, where a Smart NIC includes a hardware offload engine for encapsulating NVMe data storage transactions, SNI orchestrator 230 may operate to direct the Smart NIC to utilize the hardware offload engine, thereby mitigating the necessity for processor 214 to perform the encapsulation.

In maintaining the operations of the data storage transactions between VMs/containers 216 and storage resources 150, SNI orchestrator 230 operates to track RDMA sessions on RDMA/Smart NIC 222, to determine if any of the associated fabric interfaces 240 have failed or have changed fabric type, and to dynamically reestablish the sessions with alternative fabric interfaces to continue the transactions in the event of failure or change. Further, when a particular storage configuration is provided for redundant storage, SNI orchestrator 230 operates to schedule data reads from both of the redundant namespace to improve the read performance of IaaS system 200.

RDMA session manager 232 maintains a list of the RDMA sessions, including the initiators, targets, and session statuses on RDMA/Smart NIC 222. Then, if any session is disconnected, RDMA session manager 232 operates to provide the session details to switch/aggregator 224 to reestablish the disconnected session. SDS vSAN service 234 maintains the SDS vSAN configurations on NVMe targets 152 and 154, including monitoring, managing, and maintaining the mirrored target information, the NVMe Target NQNs (NVMe qualified name), controller IDs, namespace IDs and the like.

Fabric hardware offload service 236 maintains the capabilities of fabric interfaces 240, including monitoring, managing, and maintaining any fabric hardware offload capabilities, such fibre channel-over-ethernet (FCoE), NVMe-over-fabric, or other offload capabilities, as needed or desired. When SNI orchestrator 230 detects a fabric interface failure or change, fabric hardware offload service 236 reconfigures the underlying hardware of fabric interfaces 240, as needed or desired. Switch/aggregator 224 dynamically reestablishes RDMA sessions with alternative fabrics of fabric interfaces 240, as needed or desired.

Figure 3:
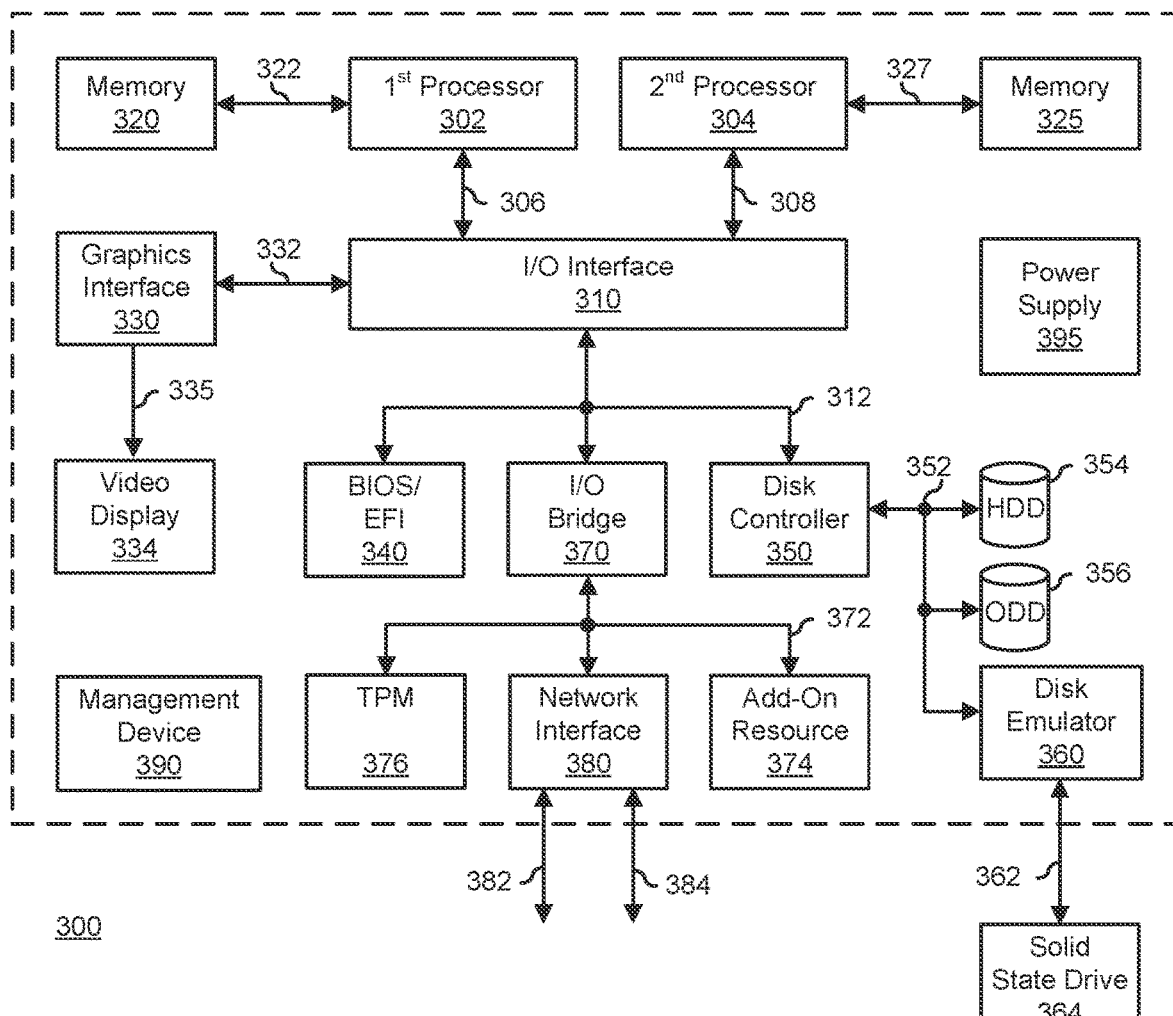
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) system-on-a-chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system in an infrastructure-as-a-service (IaaS) system, the information handling system comprising:
    a memory for storing code; and
    a processor to execute the code to instantiate an IaaS non-volatile memory-express (NVMe) orchestrator, the IaaS NVMe orchestrator configured to:
        establish a first fabric link with a first target NVMe array of storage resources of the IaaS;
        establish a second fabric link with a second target NVMe array of the storage resources;
        establish a first session on the storage resources, the first session including a first namespace on the first target NVMe array and a second namespace on the second target NVMe array, wherein the first namespace and the second namespace are mirrored namespaces, such that data write transactions that are associated with the first session are provided to both the first namespace and the second namespace;
        determine that the first fabric link has failed; and
        establish a third fabric link with the first target NVMe array in response to determining that the first fabric link has failed.

2. The information handling system of claim 1, wherein the IaaS NVMe orchestrator is further configured to:
    receive a first data read transaction; and
    split the first data read transaction such that a first portion of the first data read transaction is provided to the first namespace via the first fabric link and a second portion of the first data read transaction is provided to the second namespace via the third fabric link.

3. The information handling system of claim 2, wherein the IaaS NVMe orchestrator is further configured to:
    determine that the third fabric link has failed;
    receive a second data read transaction associated with the first session; and
    provide the second data read transaction to the second namespace via the second fabric link in response to determining that the third fabric link has failed.

4. The information handling system of claim 1, wherein the IaaS NVMe orchestrator is further configured to determine that a virtual machine instantiated on the information handling system requires a mirrored storage capacity, wherein establishing the first session is in response to determining that the virtual machine requires the mirrored storage capacity.

5. The information handling system of claim 1, wherein the IaaS NVMe orchestrator is further configured to establish a second session on the storage resources, the second session including a third namespace on the first target NVMe array and a fourth namespace on the second target NVMe array, wherein the third namespace and the fourth namespace are interleaved namespaces, such that data write transactions that are associated with the second session are interleaved across the first namespace and the second namespace.

6. The information handling system of claim 5, wherein the IaaS NVMe orchestrator is further configured to determine that a virtual machine instantiated on the information handling system requires an interleaved storage capacity, wherein establishing the second session is in response to determining that the virtual machine requires the interleaved storage capacity.

7. The information handling system of claim 1, further comprising a hardware remote direct memory access (RDMA), the hardware RDMA being associated with a third fabric link, the third fabric link being of a particular type.

8. The information handling system of claim 7, wherein the IaaS NVMe orchestrator is further configured to:
    determine that data transactions from a virtual machine are targeted to a storage device of the storage resources that is coupled to the information handling system by the third fabric link; and
    set up a RDMA session on the hardware RDMA for the data transactions between the virtual machine and the storage device via the third fabric link.

9. The information handling system of claim 8, wherein the IaaS NVMe orchestrator is further configured to:
    determine that the third fabric link has failed; and
    in response to determining that the third fabric link has failed, to:
        determine that the storage device is further coupled to the information handling system by a fourth fabric link of a different type; and
        establish a second session between the virtual machine and the storage device via the fourth fabric link.

10. The information handling system of claim 1, wherein the first fabric link and the second fabric links include one of an Ethernet link or a Fibre Channel link.

11. A method for managing data transactions on an infrastructure-as-a-service (IaaS) system, the method comprising:
    instantiating, by a processor of an information handling system of the IaaS system, an IaaS non-volatile memory-express (NVMe) orchestrator;
    establishing, by the IaaS NVMe orchestrator, a first fabric link with a first target NVMe array of storage resources of the IaaS system;
    establishing, by the IaaS NVMe orchestrator, a second fabric link with a second target NVMe array of the storage resources;
    establishing, by the IaaS NVMe orchestrator, a first session on the storage resources, the first session including a first namespace on the first target NVMe array and a second namespace on the second target NVMe array, wherein the first namespace and the second namespace are mirrored namespaces, such that data write transactions that are associated with the first session are provided to both the first namespace and the second namespace;

determining, by the IaaS NVMe orchestrator, that the first fabric link has failed; and establishing, by the IaaS system, a third fabric link with the first target NVMe array in response to determining that the first fabric link has failed.

12. The method of claim 11, further comprising:

receiving a first data read transaction; and splitting the first data read transaction such that a first portion of the first data read transaction is provided to the first namespace via the first fabric link and a second portion of the first data read transaction is provided to the second namespace via the second fabric link.

13. The method of claim 12, further comprising:

determining that the third fabric link has failed;

receiving a second data read transaction associated with the first session; and providing the second data read transaction to the second namespace via the second fabric link in response to determining that the third fabric link has failed.

14. The method of claim 11, further comprising determining that a virtual machine instantiated on the information handling system requires a mirrored storage capacity, wherein establishing the first session is in response to determining that the virtual machine requires the mirrored storage capacity.

15. The method of claim 11, further comprising establishing a second session on the storage resources, the second session including a third namespace on the first target NVMe array and a fourth namespace on the second target NVMe array, wherein the third namespace and the fourth namespace are interleaved namespaces, such that data write transactions that are associated with the second session are interleaved across the first namespace and the second namespace.

16. The method of claim 15, further comprising determining that a virtual machine instantiated on the information handling system requires an interleaved storage capacity, wherein establishing the second session is in response to determining that the virtual machine requires the interleaved storage capacity.

17. The method of claim 11, further comprising providing, on the information handling system, a hardware remote direct memory access (RDMA), the hardware RDMA being associated with a third fabric link, the third fabric link being of a particular type.

18. The method of claim 17, further comprising:

determining that data transactions from a virtual machine are targeted to a storage device of the storage resources that is coupled to the information handling system by the third fabric link; and setting up a RDMA session on the hardware RDMA for the data transactions between the virtual machine and the storage device via the third fabric link.

19. The method of claim 18, further comprising in response to determining that the third fabric link has failed:

determining that the storage device is further coupled to the information handling system by a fourth fabric link of a different type; and establishing a second session between the virtual machine and the storage device via the fourth fabric link.

20. An information handling system to provide an infrastructure-as-a-service (IaaS) system, the information handling system comprising:

storage resources including a first target non-volatile memory-express (NVMe) array and a second target NVMe array; and a host system configured to instantiate an IaaS NVMe orchestrator configured to:

establish a first fabric link with the first target NVMe array;

establish a second fabric link with the second target NVMe array;

establish a first session on the storage resources, the first session including a first namespace on the first target NVMe array and a second namespace on the second target NVMe array, wherein the first namespace and the second namespace are mirrored namespaces, such that data write transactions that are associated with the first session are provided to both the first namespace and the second namespace; and establish a third fabric link with the first target NVMe array in response to determining that the first fabric link has failed.

* * * * *